United States Patent [19]

Cahoy

[11] 3,877,925

[45] *Apr. 15, 1975

[54] PRE-EMERGENT CHEMICAL CONTROL OF WEEDS WITH N-BENZYL-N-ISOPROPYLTHIOBENZA- MIDES

[75] Inventor: Roger P. Cahoy, Overland Park, Kans.

[73] Assignee: Gulf Research & Development Company, Pittsburgh, Pa.

[ * ] Notice: The portion of the term of this patent subsequent to Dec. 26, 1991, has been disclaimed.

[22] Filed: Mar. 20, 1972

[21] Appl. No.: 236,188

Related U.S. Application Data

[63] Continuation-in-part of Ser. No. 88,166, Nov. 9, 1970, Pat. No. 3,707,366, which is a continuation-in-part of Ser. No. 9,419, Feb. 6, 1970, abandoned.

[52] U.S. Cl.................... 71/98; 71/118; 260/551 R
[51] Int. Cl................................................ A01n 9/20
[58] Field of Search............................... 71/98, 118

[56] References Cited
UNITED STATES PATENTS

| 2,412,510 | 12/1946 | Jones | 71/118 |
|---|---|---|---|
| 3,340,042 | 7/1967 | Schwartz et al. | 71/98 |

FOREIGN PATENTS OR APPLICATIONS

| 1,362,906 | 4/1964 | France | 71/98 |
|---|---|---|---|
| 972,978 | 10/1964 | United Kingdom | 71/98 |

OTHER PUBLICATIONS

Pagani et al., Chem. Abst., Vol. 73, 1970, 34059y.

*Primary Examiner*—Lewis Gotts
*Assistant Examiner*—Catherine L. Mills

[57] ABSTRACT

Undesired vegetation such as crabgrass, coxcomb, green foxtail, yellow foxtail, giant foxtail, barnyard grass, lambsquarters, black nightshade and pigweed are combated by pre-emergent application of an N-benzyl-N-isopropyl-3,5-dichloro-, 3-chloro- or 3,5-dimethylthiobenzamide. The method is particularly useful in combating weeds in the presence of crops such as sugar beets, peanuts, cotton, grain sorghum and soybeans.

2 Claims, No Drawings

PRE-EMERGENT CHEMICAL CONTROL OF WEEDS WITH N-BENZYL-N-ISOPROPYLTHIOBENZAMIDES

This is a continuation-in-part of U.S. patent application Ser. No. 88,166 filed Nov. 9, 1970, now U.S. Pat. No. 3,707,366 which is a continuation-in-part of U.S. patent application Ser. No. 9,419 filed Feb. 6, 1970, now abandoned.

DESCRIPTION OF THE INVENTION

The subject matter of U.S. patent application Ser. No. 88,166 is incorporated herein by reference. This earlier filed, copending application disclosed a class of N-benzyl-N-isopropylbenzamides and the use of these compounds in combating unwanted vegetation pre-emergently, particularly in the presence of rice, soybeans, cotton and perennial grasses.

Subsequent to the filing of the aforementioned application it has been discovered that a small group of thiobenzamides also possesses desirable properties as herbicides for pre-emergent control of weeds and have somewhat less toxicity to crops such as soybeans, corn and sugar beets and in some instances improved effectiveness against certain pestiferous unwanted vegetation, such as pigweed, black nightshade, yellow foxtail, green foxtail and giant foxtail. Briefly, in a class of herbicidally useful benzamides and thiobenzamides represented by the generic structural formula

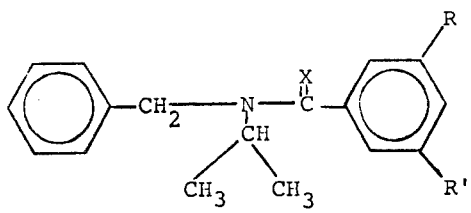

in which X may be oxygen or sulfur, R may be chloro or methyl and R' may be chloro, methyl or hydrogen, the thiobenzamides have some individual characteristics which are distinctly beneficial and fit them for certain specific applications. The following are exemplified specific thiobenzamides which are useful in the method of this invention.

N-benzyl-N-isoproply-3,5-dichlorothiobenzamide, m.p. 110°–112°C

N-benzyl-N-isopropyl-3,5-dimethylthiobenzamide, m.p. 103°–105°C

N-benzyl-N-isopropyl-3-chlorothiobenzamide m.p. 82°–84°C

N-benzyl-N-isopropyl-3-chloro-5-methylthiobenzamide m.p. 110°–113°C

The use of the 3,5-dichlorothiobenzamides to combat weeds in sugar beets is particularly desirable.

SYNTHESIS OF THE HERBICIDES

The herbicides of this invention may be readily synthesized by reaction of phosphorus pentasulfide with N-benzyl-N-isopropylbenzamides, which are made from commercially available substances, employing procedures of the type exemplified below:

Preparation of N-benzyl-N-isopropyl-3,5-dichlorothiobenzamide

A 100 ml reaction flask with an air-cooled condenser was charged with 12.9 g (0.04 mole) of N-benzyl-N-isopropyl-3,5-dichlorobenzamide and 5.5 g (0.025 mole) of phosphorus pentasulfide. The two solids were mixed and the reaction flask was placed on the steam bath. After 1 hour of heating, the solids had melted. The viscous liquid was heated for 16 hours at 55°–60°C. The reaction mass was cooled and extracted with 150 ml of ether. The material which was not soluble in ether was removed by gravity filtration. The solvent of the filtrate was evaporated and the solid residue was dissolved in hexane. The hexane solution was cooled and a light yellow solid precipitated. The product was cooled and air dried, m.p. 110°–112°C.

Anal. Calcd. for $C_{17}H_{17}Cl_2NS$: C, 60.35; H, 5.06; N, 4.14. Found: C, 60.55; H, 5.14; N, 4.24.

The N-benzyl-N-isopropylbenzamide starting materials may be synthesized by methods disclosed in copending U.S. Serial No. 88,166. The following procedure is representative of the general method.

Preparation of N-benzyl-N-isopropyl-3,5-dichlorobenzamide

A small reaction flask fitted with a magnetic stirrer, heating mantle, thermometer, water-cooled condenser and drying tube was charged with 25.0 g (0.131 mole) of 3,5-dichlorobenzoic acid, 75 ml of thionyl chloride and 6 drops of N,N-dimethylformamide. The reaction mixture was stirred and refluxed for 18 hours. The excess thionyl chloride was removed by evaporation. The liquid residue was charged to a pot fitted with a short column and appropriately equipped for vacuum distillatiion. The 3,5-dichlorobenzoyl chloride product cut weighed 24.1 g, b.p. 63°–5°C/0.3 mm.

A 500-milliliter reaction flask equipped with a magnetic stirrer, heating mantle, dropping funnel, air-cooled condenser and drying tube was charged with 7.8 g (0.052 mole) of N-benzyl-N-isopropylamine, 400 ml of benzene and 7.0 g (0.07 mole) of triethylamine. The dropping funnel contained 10.5 g (0.05 mole) of 3,5-dichlorobenzoyl chloride which was added dropwise to the stirred reaction mixture. After the addition was completed, the reaction mixture was stirred and heated at 60°–65°C for 18 hours. The mixture was cooled and the amine salt was collected on a vacuum filter. The filtrate was transferred to a separatory funnel and extracted with water which was followed by dilute aqueous hydrochloric acid.

The organic phase was dried over sodium sulfate. After removing the drying agent, the solvent was evaporated. The solid residue was warmed with hexane, cooled and the product was collected. There was obtained 9.9 g of white crystalline solid, m.p. 96°–98°C.

Anal. Calcd. for $C_{17}H_{17}Cl_2NO$: C, 63.37; H, 5.32; N, 4.35. Found: C, 63.13; H, 5.18; N, 3.95.

Various other N-benzyl-N-isopropylbenzamides may be prepared in a similar manner.

Formulation of the Herbicides

The herbicides of this invention may be conveniently formulated in organic solvents, as dry granular materials or in water-dispersible form for use in aqueous sprays. By way of illustration, N-benzyl-N-isopropyl-3,5-dichlorothiobenzamide may be formulated as about a 24 percent solution along with about 66 percent xylene or other solvent and 10 percent of a surfactant such as Agrimul A-300 or N-300, Sponto 934 or 234, Atlox 3408F or Triton X-180 or a mixture of Triton X-180 and X-190 or other dispersant or emulsifier which is recommended and approved for use with herbicides. Analyses of these surfactants are available from the agencies which approve the materials for agricultural use. In general, blends of both ionic and nonionic surfactants are desirable because they confer good water dispersibility on the formulations over a wide range of temperature, water hardness and other conditions. A blend of equal parts of Atlox 3404 and 3403F, for example, has been found to be particularly useful.

A granular formulation may be made by dissolving the herbicide in acetone and spraying the acetone solution on finely divided attapulgite while agitating as a rolling bed in a revolving drum. The resulting granules which form are then dried to remove the solvent.

USE OF THE HERBICIDES

Pre-Emergent Use of N-Benzyl-N-isopropyl-3-chlorothiobenzamide

A solution of each active compound was prepared by dissolving 290 mg of the compound to be tested in 200 ml of acetone. Disposable expanded polystyrene trays about ½ inches deep and about 1 square foot in area were prepared and seeded with a variety of species of plant seeds, then sprayed with the acetone solution at the rate of active chemical per acre of sprayed area shown in the following table and were then covered with about one-fourth inch of soil. One group of trays which had been seeded with alfalfa, brome, flax, oats, radishes and sugar beets was held at 75°F day temperature; another seeded with corn, coxcomb, cotton crabgrass, millet and soybeans was held at 85°F. Twenty-one days after seeding and treatment the plantings were examined and degree of herbicidal effect was rated according to the schedule below.

DEGREE

0 = no effect
1 = slight effect (plants recovered)
2 = moderate effect (permanent injury)
3 = severe effect (some plants died)
4 = maximum effect (all plants died)

The results are summarized in the following table.

| Compound | Rate lbs/A | Crabgrass | Coxcomb | Brome | Millet | Soybeans | Cotton | Alfalfa | Oats | Corn | Flax | Radish |
|---|---|---|---|---|---|---|---|---|---|---|---|---|
| | 5 | 4 | 4 | 2 | 3 | 0 | 0 | 4 | 2 | 1 | 2 | 3 |
| | 2 | 4 | 4 | 1 | 3 | 0 | 0 | 4 | 2 | 0 | 1 | 2 |
| | 1 | 4 | 4 | 1 | 3 | 0 | 0 | 4 | 1 | 0 | 1 | 1 |

Pre-Emergent Use of Two Herbicides on Twenty-Four Species of Plants

Tifflite half-flats were seeded and sprayed with compounds, as previously described, at 3 lb/A and 1 lb/A rates.

Plant emergence and herbicidal effects were rated as above.

The results are summarized in the following table.

RESULTS

| Compound | Rate lbs/A | Rice | Wild Oats | Wheat | Shattercane | Grain Sorghum | Corn | Alfalfa | Green Foxtail | Barnyard Grass | Soybean | Morning Glory | Cocklebur | Wild Mustard | Wild Buckwheat | Sugar Beet | Tomato | Cotton | Peanut | Nutsedge | Giant Foxtail | Downy Brome | Crabgrass | Lambsquarter | Pigweed |
|---|---|---|---|---|---|---|---|---|---|---|---|---|---|---|---|---|---|---|---|---|---|---|---|---|---|
| 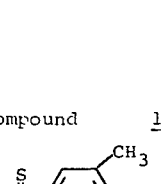 | 3 | 1 | 1 | 3 | 1 | 1 | 2 | 3 | 4 | 4 | 1 | 1 | 0 | 3 | 1 | 1 | 4 | 0 | 0 | 0 | 4 | 1 | 4 | 4 | 4 |
| | 1 | 0 | 0 | 2 | 0 | 0 | 1 | 2 | 4 | 4 | 0 | 0 | 0 | 2 | 0 | 0 | 1 | 0 | 0 | 0 | 4 | 1 | 4 | 4 | 4 |
| 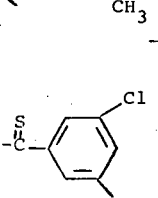 | 3 | 1 | 4 | 2 | 1 | 0 | 0 | 4 | 4 | 4 | 0 | 1 | 1 | 4 | 2 | 1 | 4 | 0 | 0 | 0 | 4 | 4 | 4 | 4 | 4 |
| | 1 | 0 | 2 | 1 | 0 | 0 | 0 | 1 | 4 | 1 | 0 | 0 | 0 | 3 | 1 | 0 | 1 | 0 | 0 | 0 | 4 | 3 | 4 | 4 | 4 |

Pre-Emergent Use of N-benzyl-N-isopropyl-3,5-dichlorothiobenzamide on Sugar Beets with Six Weed Species Common to this Crop Greenhouse potting soil was used in 12 × 6 × 2¾ inch molded polystyrene foam (Tufflite) flats. Treatments were sprayed at forty gallons per acre with a 6501 nozzle. The compound was not incorporated in the soil. The test was evaluated for plant emergence and herbicidal effects four weeks after spraying. The results (rated as previously described) are summarized in the following table.

RESULTS

| Compound | Rate lbs/A | Peanut | Cotton | Cocklebur | Beggar Weed | Velvet leaf | Tomato | Alfalfa | Soybean | Morning Glory | Jimson Weed | Barnyard Grass | Yellow Foxtail | Crabgrass | Pigweed |
|---|---|---|---|---|---|---|---|---|---|---|---|---|---|---|---|
| (C₆H₅-CH₂-N(CH₃)-C(=S)-3,5-dichlorophenyl, isopropyl on N) | 4 | 0 | 0 | 1 | 4 | 4 | 4 | 4 | 1 | 1 | 3 | 4 | 4 | 4 | 4 |
| | 2 | 0 | 0 | 0 | 1 | 0 | 4 | 4 | 0 | 0 | 2 | 3 | 4 | 4 | 4 |
| | 1 | 0 | 0 | 0 | 0 | 0 | 1 | 0 | 0 | 0 | 0 | 1 | 4 | 4 | 3 |
| | 1/2 | 0 | 0 | 0 | 0 | 0 | 0 | 0 | 0 | 0 | 0 | 0 | 3 | 3 | 0 |

Since peanuts are grown in the same areas as cotton, the same weeds are encountered. The above results demonstrate the control of some of the more troublesome weeds usually found in peanut and cotton fields.

Pre-Emergent use of N-Benzyl-N-Isopropyl-3,5-Dichlorothiobenzamide on Soybeans, Cotton, Peanuts, Tomatoes, Alfalfa and Nine Weed Species Greenhouse potting soil was used in 12 × 10 × 3 inch molded polystyrene foam (Tufflite) flats. Application was made at 40 gal/A with a 6501 nozzle. None of the treatments was incorporated in the soil. The results (rated as previously described) are summarized in the following table.

RESULTS

| Compound | Rate lbs/A | Barnyard Grass | Yellow Foxtail | Sugar Beets | Black Nightshade | Pigweed | Lambsquarters | Kochia |
|---|---|---|---|---|---|---|---|---|
| | 4 | 4 | 4 | 2 | 4 | 4 | 4 | 3 |
| | 2 | 4 | 4 | 1 | 4 | 4 | 4 | 0 |
| | 1 | 4 | 4 | 0 | 3 | 4 | 4 | 0 |
| | 1/2 | 1 | 3 | 0 | 2 | 1 | 4 | 0 |

Use of N-benzyl-N-isopropyl-3,5-dichlorothiobenzamide to combat weeds in sugar beets is particularly beneficial and is a preferred use because the present methods of sugar beet culture create such a favorable environment for weeds that weed control problems are severe.

I claim:

1. The method of combating unwanted vegetation by applying pre-emergently to the locus of the seeds of unwanted vegetation a herbicidally effective quantity of a compound selected from the group consisting of N-benzyl-N-isopropyl-3,5-dichlorothiobenzamide, N-benzyl-N-isopropyl-3,5-dimethylthiobenzamide, N-benzyl-N-isopropyl-3-chlorothiobenzamide, and N-benzyl-N-isopropyl-3-chloro-5-methylthiobenzamide.

2. Combating weeds in sugar beets by applying pre-emergently to the locus of the weed seeds a herbicidally effective quantity of N-benzul-N-isopropyl-3,5-dichlorothio-benzamide.

* * * * *